United States Patent
Grubb et al.

[11] 3,778,165
[45] Dec. 11, 1973

[54] PORTABLE FLOW-THROUGH DISPENSING REFRACTOMETER APPARATUS

[75] Inventors: John J. Grubb, La Habra; Keichi Tomei, Monterey Park, both of Calif.

[73] Assignee: Hamilton Company, Whittier, Calif.

[22] Filed: May 24, 1971

[21] Appl. No.: 146,283

[52] U.S. Cl. .................................. 356/128, 320/4
[51] Int. Cl. .......................................... G01n 21/46
[58] Field of Search .................... 356/128, 130–137; 320/2, 4; 250/218

[56] References Cited
UNITED STATES PATENTS

| | | | |
|---|---|---|---|
| 2,885,923 | 5/1959 | Simmons | 356/136 |
| 2,885,922 | 5/1959 | Miller | 356/130 |
| 3,421,821 | 1/1969 | Alessi | 356/186 |
| 3,641,336 | 2/1972 | Boin | 320/4 X |
| 3,659,180 | 4/1972 | Urbush | 320/2 |

FOREIGN PATENTS OR APPLICATIONS

| | | | |
|---|---|---|---|
| 257,127 | 8/1926 | Great Britain | 356/136 |

*Primary Examiner*—Ronald L. Wibert
*Assistant Examiner*—F. L. Evans
*Attorney*—J. Carroll Baisch

[57] ABSTRACT

A portable flow-through dispensing refractometer apparatus having a specimen plate and a meter with refractive index scales. There is a flow-through cell, which includes the specimen plate, and a finger operated pump for precise volume pick up of specimens, or samples, for introduction into the flow-through cell. A built-in light source provides for illumination of the specimen plate to improve visual reading of the scales of the meter. There is a rechargeable battery in the handle of the apparatus and a stand to which the refractometer apparatus is removably attached and supported; a rectifier in the stand is adapted to be connected to a source of electrical energy and supplies electric current to the battery for charging it when the refractometer apparatus is attached to the stand.

9 Claims, 13 Drawing Figures

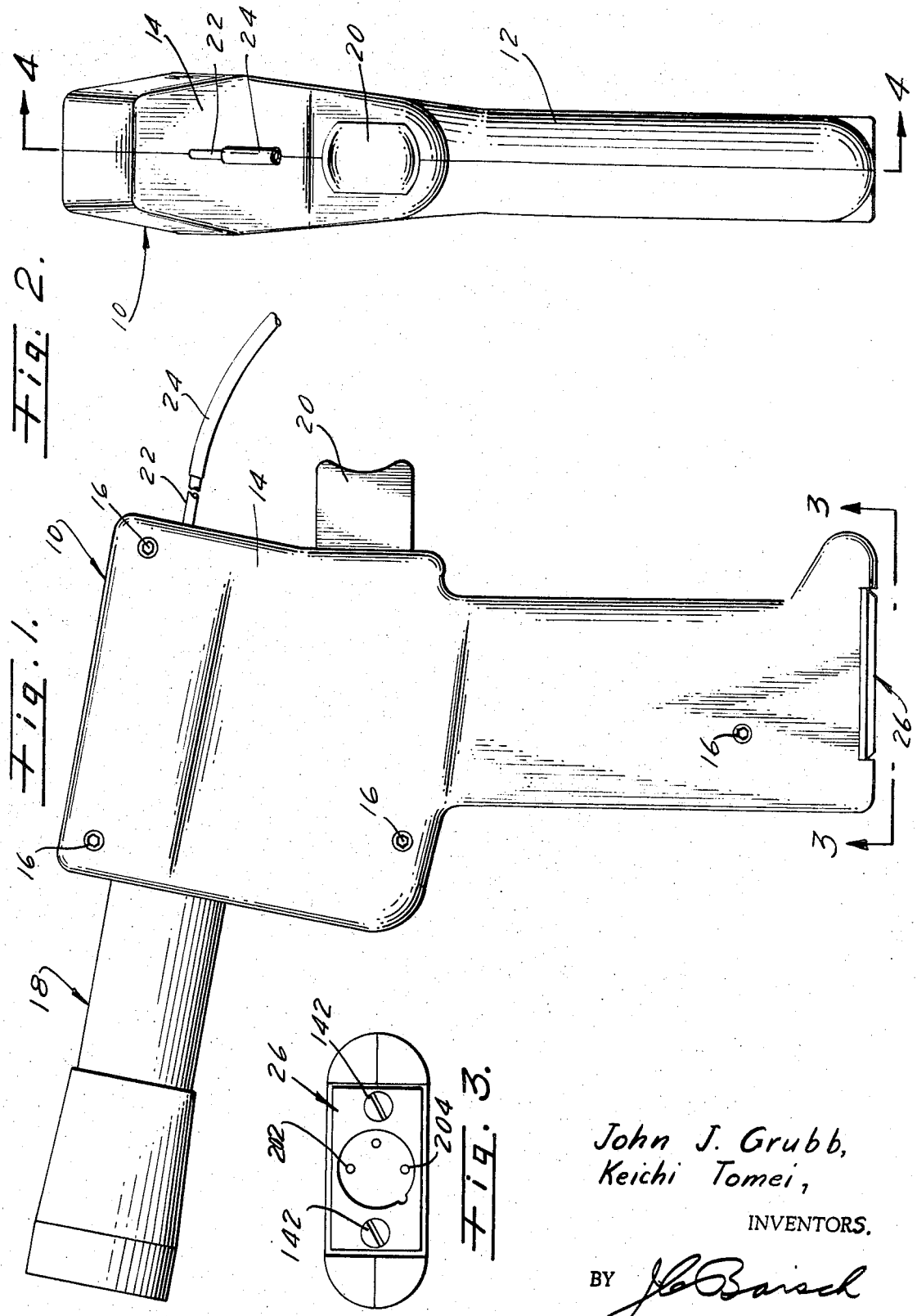

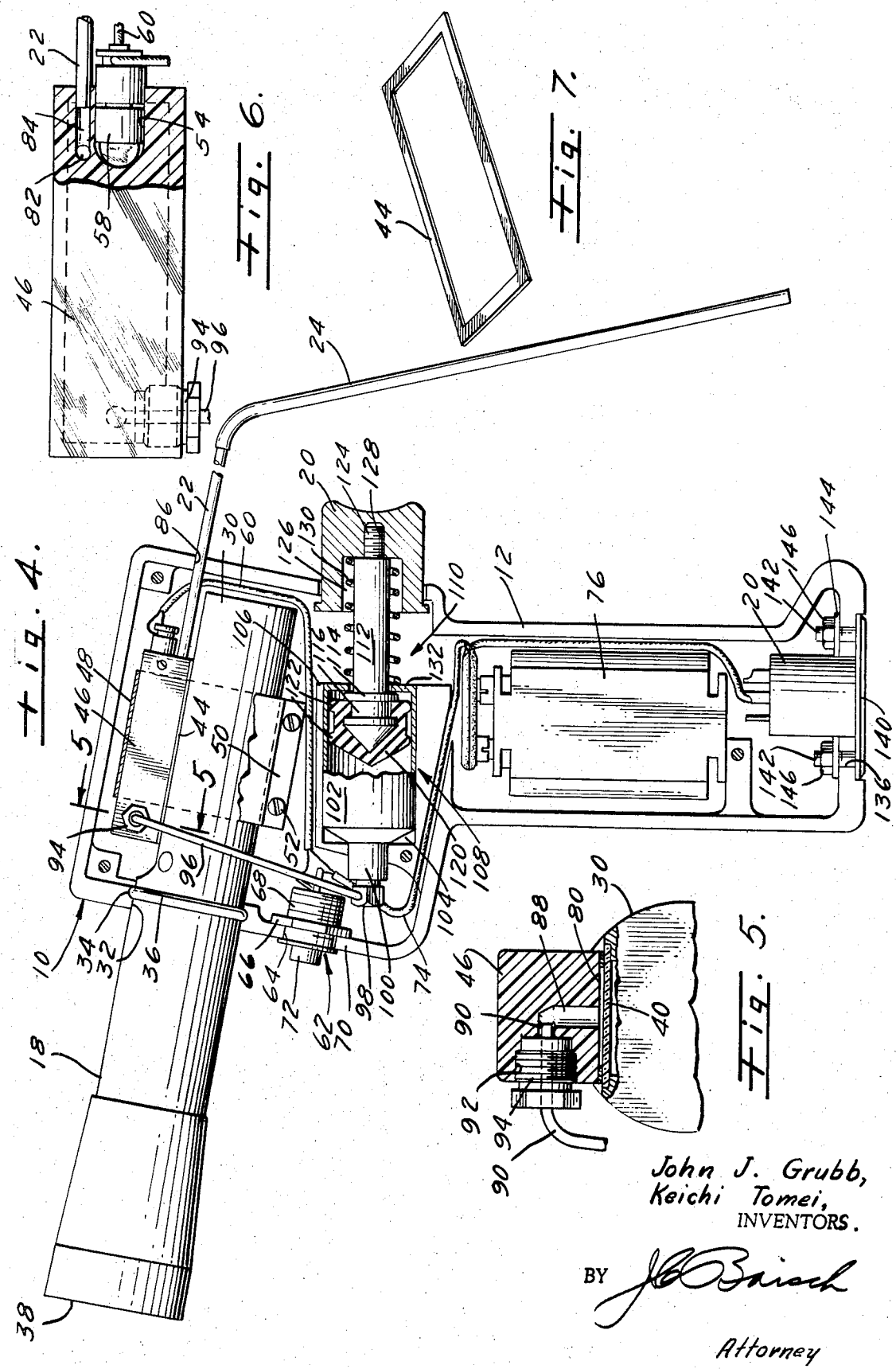

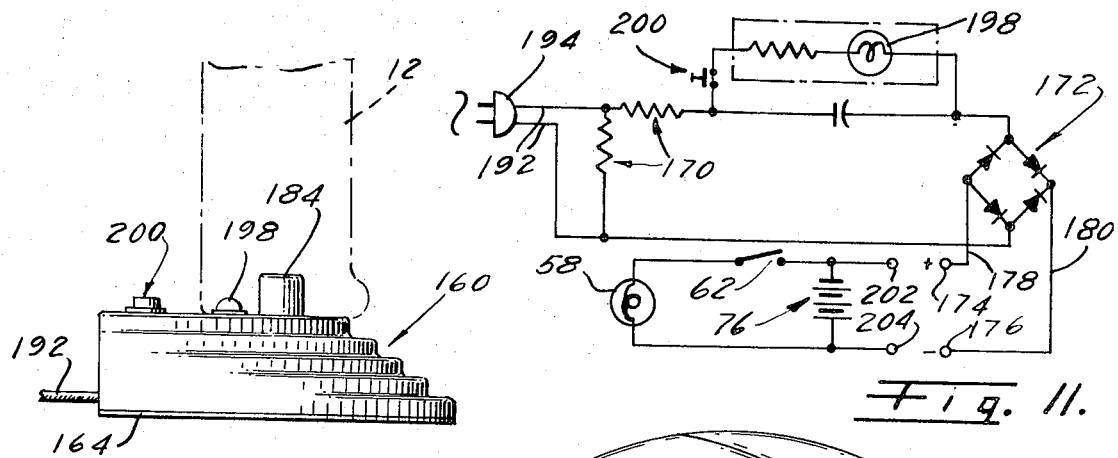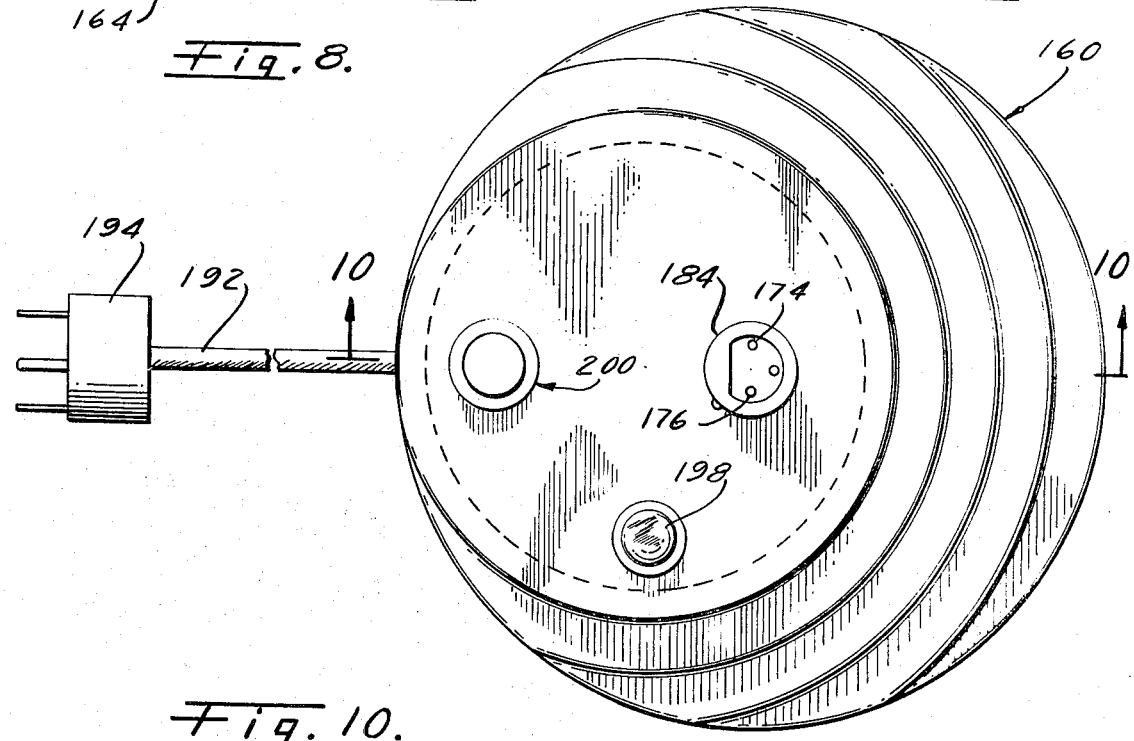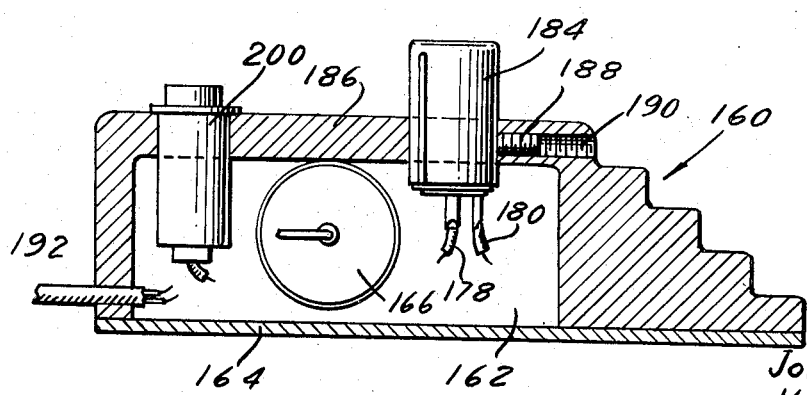

John J. Grubb,
Keichi Tomei,
INVENTORS.

PORTABLE FLOW-THROUGH DISPENSING REFRACTOMETER APPARATUS

BACKGROUND OF THE INVENTION

1. Field of the Invention

The present invention relates generally to apparatus for analyzing various substances and relates more particularly to apparatus for determinations of total solids, water or protein concentration, specific gravity and refractive index in urine, serum and plasma.

2. Description of the Prior Art

There are refractometers, urinometers and other instruments for making such determinations.

One refractometer presently on the market has a sample plate upon which a specimen to be analyzed is placed by hand. There is an external light source but the scale is not properly illuminated. The device is portable but can be mounted on a special stand and secured thereto, then it is not portable.

After a reading has been made, it is necessary to wipe the specimen plate to clean it.

SUMMARY OF THE INVENTION

The invention comprises a casing having a pistol grip, or handle. There is a refractometer with a meter therein and scales which provide various information as a result of the analysis of samples. At one end, the refractometer has a sample plate and this end is disposed within the casing.

A transparent cover plate is disposed over a specimen plate and the adjacent sides of the cover plate and specimen plate are spaced apart by a thin gasket which, with the specimen plate and the cover plate, define a flowthrough cell. The cover plate has a recess at one end in which an electric light is disposed for illuminating the cover plate and, hence, the specimen or sample within the cell, so that the scales of the refractometer meter will be clearly visible and easily read.

Within the hollow casing is a pump having a cylinder and a plunger which is manually actuated by a finger of the operator. The cylinder of the pump has a connection with one end of the flow-through cell. There is a tube having one end connected with the opposite end of the flow-through cell and having a downwardly-extending tube connected with its outer end. When it is desired to draw a liquid sample, or specimen, into the flow-through cell the free end of the downwardly-extending tube is placed into a receptacle having the sample or specimen therein. The pump plunger is actuated inwardly and then, when released, a spring causes said plunger to move outwardly to its normal position. As the pump plunger moves outwardly the sample or specimen is sucked into the flow-through cell.

Electrical energy for the electric light in the cover plate supplies current to energize said light and there is a normally open switch in the circuit from the battery to the light. When the specimen has been drawn into the flow-through cell the switch is actuated and the cover plate becomes illuminated by the electric lamp, or light, and the specimen is thus illuminated, so that the meter scales will be clearly visible and easily read.

The battery is of the rechargeable type and there is an electric receptacle in the handle of the apparatus with which the battery is operably connected. Within the base there is a rectifier adapted to be connected with a source of electric current or power and said rectifier is operably connected with the plug so that, when the receptacle is connected with the plug, the battery will receive current from the rectifier for charging said battery.

OBJECTS AND ADVANTAGES OF THE INVENTION

It is an object of the invention to provide a refractometer that is portable.

Another object of the invention is to provide apparatus of this character having a flow-through cell for the specimen, or sample, thus eliminating the handling of specimens.

It is still another object of the invention to provide an instrument or apparatus of this character having a built-in light source to provide adequate lighting of the specimen and the scales, so that the latter will be clearly visible and easily read.

A further object of the invention is to provide apparatus of this character that eliminates the need for wiping specimens off the specimen plate.

A still further object of the invention is to provide apparatus of this character providing precise volume pick up.

Another object of the invention is to provide apparatus of this character that eliminates contamination from previous specimens.

Still another object of the invention is to provide apparatus of this character with which tests and determinations may be made faster and with great accuracy.

A further object of the invention is to provide apparatus of this character having means for charging or recharging the battery for the light.

The characteristics and advantages of the invention are further sufficiently referred to in connection with the accompanying drawings, which represent certain embodiments. After considering these examples, skilled persons will understand that variations may be made without departing from the principles disclosed, and we contemplate the employment of any structures, arrangements or modes of operation that are properly within the scope of the appended claims.

DESCRIPTION OF THE DRAWINGS

Referring to the drawings, which are for illustrative purposes only:

FIG. 1 is a side-elevational view of apparatus embodying the present invention;

FIG. 2 is a front-end elevational view thereof;

FIG. 3 is an elevational view of the free end of the handle as viewed from line 3—3 of FIG. 1;

FIG. 4 is a sectional view taken on line 4—4 of FIG. 2;

FIG. 5 is a sectional view taken on line 5—5 of FIG. 4;

FIG. 6 is a side-elevational view of the covering plate with a portion thereof broken away to show the light for illuminating said cover plate;

FIG. 7 is a perspective view of the gasket between the cover plate and the specimen plate to define, with said cover plate and said specimen plate, a flow-through cell;

FIG. 8 is a side-elevational view of a base for the refractometer apparatus;

FIG. 9 is top-plan view of said base;

FIG. 10 is a sectional view through the base taken on line 10—10 of FIG. 9;

FIG. 11 is a wiring diagram of the electrical circuits of the apparatus;

DESCRIPTION OF THE PREFERRED EMBODIMENTS

Figure 12:
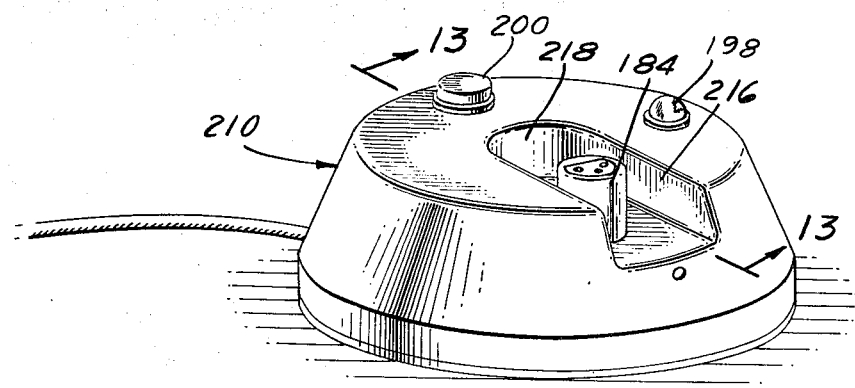
FIG. 12 is a perspective view of an alternative base.

Referring to FIGS. 1 and 2, there is shown apparatus embodying the present invention, said apparatus comprising a casing, indicated generally at 10, having a handle 12. The casing and handle comprise oppositely-arranged, complimentary parts 14 secured together by screws 16. A refractometer, indicated generally at 18, has a portion thereof disposed within the casing, as will be more particularly described hereinafter.

The refractometer 18 has a portion that extends outwardly of the casing and, at the opposite side of the casing, there is a plunger button 20 that extends outwardly of the casing and located for easy operation by a finger of the operator when holding the handle 12. At the same end of the casing having the plunger button 20, there extends a tube 22 to which is attached a tube 24 which extends downwardly and forwardly, as shown in FIG. 4.

At the lower underside of the free end of the handle, there is an electric receptacle, indicated generally at 26, which will be described more particularly hereinafter.

Referring to FIG. 4, there is shown one side of the casing 10, the other side having been removed, the casing with its handle being hollow.

Refractometer 18 has a part 30 that is disposed within the casing, there being an opening 32 at the back of the casing through which the refractometer extends and the opening having a groove 34 for reception of an o-ring 36 which is disposed in an external groove of the refractometer, thereby securing the refractometer in position.

The outer end of the refractometer is provided with an eye piece 38. That portion of the refractometer disposed within the casing has a specimen plate 40, as best shown in FIG. 5. Within the refractometer there is a meter and scales which give certain readings or information relative to samples or specimens disposed on the specimen plate.

The refractometer and the parts thereof hereinabove described are well known and one such refractometer is manufactured by the American Optical Company, Instrument Division, Buffalo, N.Y.

A gasket 44 is disposed on the specimen plate and on this gasket there is disposed a transparent cover plate of suitable material such as, for example, a clear plastic. One such plastic that is very satisfactory is Lucite which consists essentially of polymerized methyl methacrylate. Other suitable materials may also be used.

The gasket 44 and cover plate 46 are secured to the tubular body of the refractometer by means of a clamp 48 which encompasses these parts and which has a pair of generally radially-extending flanges 50 at the free ends of the clamp, and said flanges 50 are secured together by means of screws 52 and nuts therefor, not shown.

At one end of the cover plate 46 there is a recess 54 for reception of an electric light, or lamp, 58 operably secured in said recess. Wires 60 lead to a normally open push-button switch 62 which has a part which extends through an opening 64 provided therefor in the back wall of the casing, a nut 66 being threadably disposed on an externally-threaded part 68 of the switch 62 and being screwed tightly against the inner side of the back wall 70 of the casing. A button 72 extends outwardly from the back wall of the casing and is adapted to actuate the switch to the closed position. Switch 62 is operably connected by wires 74 with a battery 76 operably disposed in the hollow handle 12. When the light 58 is turned on the cover plate is illuminated and provides illumination to the sample or specimen disposed in the cell 80 defined by the cover plate 40, gasket 44 and the cover plate 46.

The cell 80 is very shallow, having what is termed a forward end thereof, and the cover plate is provided with a passage 82, the lower end of which communicates with the forward end of the cell 80. The upper end of the passage 82 communicates with the passage 84 which extends to the rear end of the cover plate. An end portion of the tube 22 is secured in the forward end portion of the passage 84 and said tube extends forwardly through an opening 86 in the forward wall of the casing. One end of the tube 24 is disposed on the forward, or free end, of the tube 22, the tube 24 extending downwardly and forwardly. Tube 24 may be of any suitable material but nylon has been found to be very satisfactory.

Adjacent the rear end of the cover plate, the latter has an upwardly-extending passage 88 which communicates at its lower end with the rear end of the cell 80. There is, also, a horizontal passage 90, the inner end of which communicates with the upper end of the passage 88. There is an enlarged, tapped outer-end portion 92 of passage 90 into which is threadably screwed a fitting, or tube seal screen, 94 on one end of a tube 96, the opposite end of said tube 96 being secured in a fitting 98 screwed into an opening, or passage, in a nipple 100 at the rear end of a pump cylinder 102 which is disposed in a bore 104 provided therefor in a boss 106 in the casing, said boss being integral with the adjacent side wall of the casing part shown in FIG. 4. Other means may, of course, be used to secure the pump cylinder 102 within the casing.

The pump, which is indicated generally at 108, includes the cylinder 102 and, also, a plunger assembly, indicated generally at 110. Plunger assembly 110 comprises a plunger shaft 112 with an enlarged inner end 114 in which there is an external annular flange 116 for reception of an internal flange of a plunger head 120. Head 120 may be of any suitable material such as a plastic, for example, or a natural rubber; and there is an external annular groove in said head with external annular flanges 122 which are axially spaced apart and which slidingly and sealing engage the inner surface of the cylinder wall.

At the outer end of the plunger shaft 112 there is a reduced-diameter, externally-threaded extension 124. Button 20 has a bore 126 extending from the rear end and there is a reduced-diameter tapped bore 128 into which the reduced-diameter extension 124 is screwed. Bore 126 is larger in diameter than the diameter of the plunger shaft and there is a spring 130 on said plunger shaft which reacts against the bottom of the bore 126 and the forward end wall 132 of the cylinder 102, said end wall having an opening therethrough through which the plunger shaft operably extends. Spring 130 yieldingly urges the plunger button to its outer position.

The receptacle 20 is disposed in the lower free end of the handle 12 and is received in an opening 136 provided therefor in the lower end wall of the handle. The outer end of the opening 136 is enlarged as at 138, a flange 140 of the receptacle being seated in said enlarged part 138. There are a pair of bolts 142 extending from the flange 140 and a washer 144 has an edge portion that seats on the inner side of the lower end wall of the handle. Nuts 146 on said bolts secure the receptacle in position.

To use the above-described apparatus, the handle is gripped in the operator's hand. The tube 124 is inserted into a receptacle containing the sample material to be tested. The plunger button 20 is then pressed inwardly by a finger of the operator, thereby causing the plunger head to be moved to or toward the end of the cylinder 102 opposite the wall 132 whereat said plunger head is normally positioned. This movement of the plunger forces air out of the system which includes the conduit 96, cell 80, tube 22 and tube 24. Upon release of the plunger button, spring 130 actuates said button outwardly and, thus, retracts the plunger head 120 to the normal at-rest position, as shown in FIG. 4. As the plunger head moves in the spring-urged direction, sample material is drawn through the tube 24, tube 22 and cell 80, so that cell 80 is filled with the sample material; and because of the shallow depth of said cell a thin coating of sample is spread over the sample plate 40. The operator then presses the switch button 72 to effect energizing of the electric lamp which, in turn, illuminates the entire cover plate. The light from the cover plate illuminates the specimen plate so that the scales of the meter are quickly and easily read.

When the apparatus is used for making a urinalysis the scale giving the specific gravity is read. Since there has been a precise volume pick up by the apparatus, the sample is discharged into a centrifuge tube by pressing the plunger button 20. The apparatus is then rinsed twice and the next specimen drawn into the cell 80. This procedure is continued for subsequent tests and disposal of the sample material in respective centrifuge tubes.

From the foregoing it will be apparent that by having the flow-through cell 80 the need to place a drop of a specimen, such as a drop of urine, on the specimen plate is eliminated; and also eliminated is the necessity for wiping off the specimen from the specimen plate.

Further, the apparatus is easy to hold and is portable and by having the build-in light source the meter may be read wherever the apparatus is used.

Handling of the specimen is also eliminated and by having the large volume flow-through cell previous samples are washed away, thus eliminating contamination from such previous specimens.

Specific gravity readings are made when a precise volume of the sample has been picked up and, after the specific gravity reading has been made, the sample is delivered to the respective centrifuge tubes, so that handling of the specimen is eliminated.

Referring to FIGS. 8, 9 and 10, there is shown a base, indicated generally at 160, and which may be of any suitable material such as plastic. One material that has been found to be very satisfactory is polycarbonate. The base has a recess 162 in the bottom thereof and said recess is closed by a bottom plate 164 which may also be of plastic, or any other suitable material.

Within the recess 162 there is a unit 166 containing certain of the electrical elements such as a capacitor, resistors and a rectifier, shown respectively at 168, 170 and 172. The output side of the rectifier is connected to terminals 174 and 176, respectively, by wires 178 and 180, said terminals 174 and 176 being disposed in a plug 184 disposed in an opening provided therefor in the top wall 186 of the base recess. Plug 184 is secured in position by means of a set screw 188 disposed in a tapped bore 190 which extends into the opening in which the plug 184 is disposed.

Power is supplied to the system by means of wires 192 connected with an electric plug 194 for plugging into a receptacle having a connection with a source of electric power. The electrical system in the base is provided with an electric light 198 which may be controlled by a normally open switch 200.

Receptacle 20 has contacts 202 and 204 which engage contacts 174 and 176, respectively, when the handle of the apparatus is placed on the plug 184. Current is then supplied by the rectifier to charge or recharge battery 76. Charging of the battery continues as long as the receptacle 20 is disposed on the plug 184.

Whenever it is desired to use the refractometer apparatus it is removed from the plug 184 and the procedure hereinabove described is followed.

Figure 13:
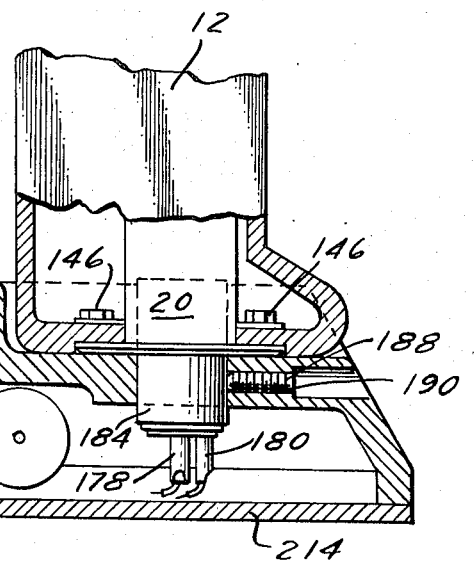
FIG. 13 is a sectional view therethrough taken on line 13—13 of FIG. 12.

Referring to FIGS. 12 and 13, an alternative base arrangement is shown. This base is indicated generally at 210 and has a hollow interior, as indicated as 212. Base 210 has a bottom plate 214 which closes the recess 212.

The top of base 210 is provided with a recess 216 having the top and one end open, the inner end being rounded as at 218.

Recess 216 is, thus, shaped to accommodate the lower end of the handle 12 and, with the plug 184 extending upwardly within said recess, the receptacle 20 is easily connected with the plug 184. By having the recess 116 the refractometer is properly positioned on the base and is held against twisting or turning by the walls of said recess 216.

The invention and its attendant advantages will be understood from the foregoing description and it will be apparent that various changes may be made in the form, construction and arrangement of the parts of the invention without departing from the spirit and scope thereof or sacrificing its material advantages, the arrangement hereinbefore described being merely by way of example, and we do not wish to be restricted to the specific form shown or uses mentioned, except as defined in the accompanying claims.

We claim:

1. A portable flow-through testing apparatus comprising:
   a refractometer instrument having a specimen plate;
   means defining with said specimen plate a shallow flow-through cell;
   pipe means having one end connected to one end of the flow-through cell, the opposite end of said pipe means being free and open;
   pump means operably connected to the opposite end of said flow-through cell, wherein actuation of the pump is adapted to draw a specimen into said cell to provide a thin specimen film on the specimen plate and a precise predetermined volume of said specimen, thereby providing a specific gravity reading of said predetermined volume of said specimen;

an electric light for illuminating said specimen plate;

the means defining with said specimen plate a shallow flow-through cell includes a transparent cover plate for said specimen plate and the electric light illuminates the cover plate, thereby illuminating the specimen plate;

a gasket between the specimen plate and the cover plate; and a switch for controlling the energizing of the electric light.

2. The invention defined by claim 1, wherein the pump comprises a pump cylinder, a plunger for said pump cylinder, and a spring yieldingly urging the plunger to a normal, at-rest position, said plunger being adapted to be manually actuated against the force of said spring.

3. The invention defined by claim 1, including a hollow casing with a handle, that portion of the refractometer instrument having the specimen plate, cover plate and electric light, the pump, and said switch being disposed within the casing, said switch having an actuating switch member exposed exteriorly of the casing, and the pump plunger extending outwardly of the casing and having a plunger button thereon for manually actuating said plunger.

4. The invention defined by claim 3, wherein the handle is hollow and there is a battery in said handle connected with the electric light by means of an electric circuit, said switch being in said circuit and being normally open.

5. The invention defined by claim 4, wherein the battery is chargeable and rechargeable.

6. The invention defined by claim 5, wherein there is a receptacle disposed in the handle, said receptacle being operably connected with the battery.

7. The invention defined by claim 6, in combination with a supporting base having a recess therein defined at the top by a top wall having an opening therein; a plug extending through said opening and secured therein; and an electrical system in said recess, said system including a rectifier having an operable connection with said plug and adapted to be connected to a source of electric current, the receptacle in the hollow handle of the casing being removably disposable on the plug with the lower end of the handle resting on said top wall.

8. The invention defined by claim 7, including an electric light connected with said electrical system in the recess of the base, said light being externally visible, and a normally open switch for controlling said light, said switch having a switch button accessible from the exterior of the casing.

9. The invention defined by claim 7, wherein the base has an external recess and the plug extends upwardly in said external recess, said external recess being for reception of the lower end of the handle.

* * * * *